United States Patent
Upadhye et al.

(10) Patent No.: US 6,571,564 B2
(45) Date of Patent: Jun. 3, 2003

(54) TIMED CONTAINER WARMER AND COOLER

(76) Inventors: Shashank Upadhye, 2050 Bunker Cir., Naperville, IL (US) 60563; Shilpa Upadhye, 2050 Bunker Cir., Naperville, IL (US) 60563

(*) Notice: Subject to any disclaimer, the term of this patent is extended or adjusted under 35 U.S.C. 154(b) by 0 days.

(21) Appl. No.: 10/004,130

(22) Filed: Oct. 23, 2001

(65) Prior Publication Data

US 2003/0074903 A1 Apr. 24, 2003

(51) Int. Cl.[7] .................. F25B 21/02; F25D 25/00; F28F 7/00; H05B 1/22; A47J 39/00
(52) U.S. Cl. .................. 62/3.3; 62/3.64; 62/62; 219/501; 219/689; 165/80.5; 220/592.17
(58) Field of Search .................. 62/3.3, 3.64, 62; 219/501, 689; 165/80.5; 220/592.17; 257/205

(56) References Cited

U.S. PATENT DOCUMENTS

| | | | |
|---|---|---|---|
| 1,762,171 A | * 6/1930 | Goldsmith | 219/436 |
| 2,170,287 A | 8/1939 | Kinnebrew | |
| 2,394,618 A | 2/1946 | Kunasch | |
| 2,456,548 A | 12/1948 | Weiner | |
| 2,490,580 A | 12/1949 | Colla | |
| 2,696,594 A | 12/1954 | Harrington | |
| 2,756,031 A | 7/1956 | Sanstrom | |
| 2,834,566 A | 5/1958 | Bower | |
| 2,992,316 A | 7/1961 | Baumstein | |
| 3,363,214 A | 1/1968 | Wright | |
| 3,402,763 A | 9/1968 | Peterson | |
| 3,611,274 A | 10/1971 | Low | |
| 3,658,122 A | 4/1972 | Kalyk | |
| 3,737,835 A | 6/1973 | Clement | |
| 3,804,076 A | 4/1974 | Fant | |
| 3,808,577 A | 4/1974 | Mathauser | |
| 3,892,945 A | * 7/1975 | Lerner | 200/85 R |
| 4,045,105 A | 8/1977 | Lee | |
| 4,187,412 A | 2/1980 | Ernster | |
| 4,215,785 A | 8/1980 | Schwaiger | |
| 4,274,262 A | 6/1981 | Reed | |
| 4,455,842 A | 6/1984 | Granlund | |
| 4,535,604 A | 8/1985 | Cavalli | |
| 4,538,427 A | 9/1985 | Cavalli | |
| 4,573,329 A | 3/1986 | Cavalli | |
| 4,597,435 A | * 7/1986 | Fosco, Jr. | 126/261 |

(List continued on next page.)

FOREIGN PATENT DOCUMENTS

| | | |
|---|---|---|
| GB | 2234057 A | 1/1991 |
| GB | 2236386 A | 4/1991 |
| GB | 2344523 A | 6/2000 |

OTHER PUBLICATIONS

Undated Product: Gerber—Electric Bottle Warmer Model #1500076022.
Undated Product: Dex Traveller Bottle Warmer Model #—??.
Undated Product: Avent America Bottle Warmer Model #??.
Undated Product: First Years—Day & Night Bottle Warmer Model #??.
Undated Product: Playskool—Dusk to Dawn Bottle Warmer Model #??.
Undated Product: Safety First—Dusk to Dawn Bottle Warmer Model #??.

Primary Examiner—William C. Doerrler
Assistant Examiner—Filip Zec
(74) Attorney, Agent, or Firm—Shashank Upadhye

(57) ABSTRACT

Disclosed is an invention related to a warmer and cooler for a container that is programmably timed to engage a heating and/or cooling unit. The invention may be adapted for use with a baby bottle to facilitate nighttime feedings by programming when the unit should be turned on to heat the bottle or cool the bottle.

67 Claims, 6 Drawing Sheets

U.S. PATENT DOCUMENTS

| | | | |
|---|---|---|---|
| 4,681,458 A | | 7/1987 | Cavalli |
| 4,827,732 A | | 5/1989 | Suyama |
| 4,874,316 A | | 10/1989 | Kamon |
| 4,880,535 A | | 11/1989 | Burrows |
| 4,903,506 A | | 2/1990 | Delisle |
| 4,913,318 A | | 4/1990 | Forrester |
| 4,914,920 A | | 4/1990 | Carnagie |
| 4,920,763 A | | 5/1990 | Provest |
| 5,060,479 A | | 10/1991 | Carmi |
| 5,209,069 A | * | 5/1993 | Newnan ................. 222/146.6 |
| 5,315,084 A | * | 5/1994 | Jensen ....................... 165/61 |
| 5,363,746 A | | 11/1994 | Gordon |
| 5,397,031 A | | 3/1995 | Jensen |
| 5,399,102 A | | 3/1995 | Devine |
| 5,462,452 A | | 10/1995 | Devine |
| 5,480,313 A | | 1/1996 | d'Alayer de Costemore |
| 5,502,981 A | | 4/1996 | Sullivan |
| 5,572,872 A | * | 11/1996 | Hlavacek ...................... 62/3.3 |
| 5,718,124 A | | 2/1998 | Senecal |
| 5,720,171 A | | 2/1998 | Osterhoff |
| 5,771,709 A | | 6/1998 | Smith |
| 5,797,313 A | | 8/1998 | Rothley |
| 5,927,524 A | | 7/1999 | Miller |
| 5,941,729 A | | 8/1999 | Sri-Jayantha |
| 5,975,337 A | | 11/1999 | Hadley |
| 6,064,044 A | * | 5/2000 | Jerome ....................... 219/494 |
| 6,082,114 A | * | 7/2000 | Leonoff ...................... 62/3.64 |
| 6,234,165 B1 | | 5/2001 | Creighton |
| 6,279,470 B2 | * | 8/2001 | Simeray et al. ............ 165/48.1 |

\* cited by examiner

TIMED CONTAINER WARMER AND COOLER

TECHNICAL FIELD OF THE INVENTION

The invention relates to a warmer and cooler for a container that is programmably timed to engage a heating and/or cooling unit.

BACKGROUND OF THE INVENTION

Without a doubt, a newborn and infant will feed at its own schedule. This child cries until it is fed. The problem is that often, a parent is required to go downstairs (or elsewhere) and remove milk/formula from the cooler (e.g., refrigerator) or prepare it from scratch, heat it, and then come upstairs, all while the child cries. Most parents recognize that the time spent making up the bottle is agonizing for the parent and the child, Any invention that minimizes the time interval between the child awakening and being fed would be greatly received. At the end of the feeding, any unused milk must be returned to the refrigerator otherwise spoliation will occur. Given the increasing cost of formula or the difficulty in obtaining breast milk, it is desirable to save as much unused milk as possible.

Most parents understand that the child will awake roughly on schedule. It is no wonder that many jokes are made about midnight or three a.m. feedings. This recognizes an important, but surprisingly overlooked characteristic; namely that children tend to be on a schedule. Accordingly, rather than trying to fight the nighttime feeding, the parent can work with the child to minimize parental disruption. This is especially important if there is a primary care giver and the primary breadwinner in the same room, such that prolonged crying awakens the breadwinner.

In addition, traveling poses unique problems for the parents and the children. In automobile travel it is nearly impossible to adequately transport milk/formula because of cooling and then subsequent heating problems. Similarly, in overnight lodgings, often times the lodgings are not equipped with ovens, microwave ovens, refrigerators, etc. and accordingly portable devices that can substitute for cooling and heating units would be well received.

Partial solutions exist to some of the identified problems. But they fail in most respects. Some devices include flash warmers that heat a bottle quickly. Flash warmers, however, require removal of the bottle from the refrigerator. This definitely means a trip to the refrigerator by the parent. Accordingly, even though flash warmers may reduce the time spent warming the bottle versus using a traditional stovetop method or the more dangerous microwave oven method, it still does not solve a problem associated with cooling a bottle. Most importantly, though, the flash wanner cannot be adapted to have a bottle ready for when the child awakes. And yet another problem with flash warmers is that there is no way to transport it in the car for long trips. The travel requirement relegates the parent to carrying separate bottle bags, usually with freezable gel packs.

One of the problems with flash warmers is that there is no way to keep the bottle cool during the night. Trips to the refrigerator are standard procedures. Given the child's generally consistent sleep schedule, flash warmers are no use even if the child is scheduled. This is because flash warmers cannot turn on or off as a function of time. Flash warmers simply turn on when manually activated by the parent. A bottle cannot be set into the warmer over the night because the milk or formula is left unrefrigerated. Accordingly, flash warmers have no timers to provide for automated warming or cooling.

Other devices in the art discuss having separate warming and cooling compartments. For those units that purportedly are day-night warmers (also known as dusk to dawn units), these warmers are not timed and nor are they self-contained units. Human intervention is still required to manually move the bottle from the cooling portion to the heat portion. In addition, the cooling unit is a freezeable gel pack that must be removed each morning, frozen, and replaced into the unit each night. Therefore, if the parent forgets to remove it in the morning, the unit is useless for that night. None of these are timed to provide automated warming and cooling within the same compartment or enclosure. In the mode of operation, these units generally require the following steps: freeze the gel pack ahead of time, prepare milk in bottle, insert bottle in cold compartment with frozen gel pack, remove bottle when child awakens, insert bottle into warming compartment, manually activate warmer, remove bottle when warm. As the frozen gel pack thaws during the course of the night, it becomes incapable of maintaining a cold enough temperature to safely store unused formula. Again, another trip the refrigerator may be necessary in the night to return unused formula. Accordingly, whilst the parent may save a trip to the refrigerator at the begining of the feeding cycle, one will likely be required at the end of the cycle. Plainly, the dusk to dawn warmers woefully fail to solve most of the problems associated with nighttime feedings.

The other problem with flash warmers or other dusk to dawn warmers/coolers is that there is no uniform heating/cooling or temperature modulation to maintain constancy. Thus it is hard to maintain thermoequilibrium.

SUMMARY OF THE INVENTION

The foregoing problems are solved and a technical advance is achieved by the present invention. Disclosed is timed container thermoregulation device that provides for automated warming and cooling of the container. One non limiting example of the invention includes an enclosure adapted to receive a container, a timer connected with the enclosure, and a thermoregulator to regulate the temperature of the container so that a parent can set a bottle in the container, keep it cool or refrigerated, and the enclosure warms the bottle at a preselected time or in response to a timed event or in response to a predetermined event. Thus, for example, if the parent knows the child generally awakes at 2:00 am, then the timer can be set for 1:55 am to engage the warmer such that child awakes when the bottle is warmed. This avoids the parent from having to engage in extensive activity just to prepare the bottle.

It should be noted that while the disclosed embodiments relate to baby bottles, it is understood that the invention may equally include baby food bottles, medicines, or the like. It is also understood that while many embodiments shown are for single bottles, the invention may be modified to accommodate many bottles. This is useful, for example, in the case where there are multiple unrelated babies (e.g, hospital nursery, day care centers, nurseries, etc.), multiple related babies in the same room (e.g., twins, triplets, etc.), or where the baby's schedule is such that the baby will feed multiple times in the night such that it would be convenient to have one bottle be warmed for the first feeding whilst the others stay cool; and then the other bottles are warmed later.

It should be noted that while some embodiments disclosed are discussed in relation to nighttime feedings, it is understood that the invention may used at any time of day.

It should be noted that use of adjectives or positional words, such as but not limited to "in", "above", "around" or any other word that indicates a position or location, it is understood that these words are used in their non-exclusive or non-limiting sense. Furthermore, terms may be used to indicate that the invention is open-ended with respect to the features described. These terms may be "include" "such as" "including" "having" "for example" or other types of open ended terms. For example, these terms are not limiting and thus a phrase termed as "such as" should be interpreted to mean "such as, but not limited to . . . ".

The term "heatant" is used to denote the medium that carries the heat. Heatant may include, but is not limited to, a liquid, solid, vapour, or air. The term "coolant" is used to denote the medium that carries the cold. Coolants may also include a liquid, solid, vapour, or air.

It should be noted that not all the advantages described must all be found in the invention as the invention may include some or all of the advantages. Accordingly, all advantages described herein need not be present to appreciate the invention.

DETAILED DESCRIPTION OF THE INVENTION

Figure 1:
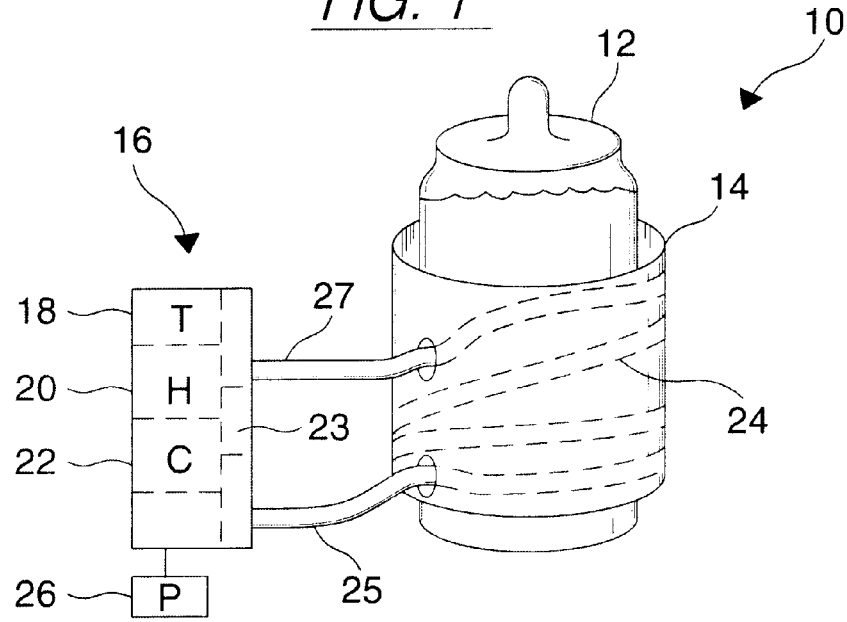
FIG. 1 is an embodiment of the invention.

FIG. 1 demonstrates an embodiment of the invention. Shown is the device 10 surrounding the container 12, such as a bottle. The bottle 12 is not necessary for the invention but is shown merely to exemplify some of the invention's features. While shown as a bottle, the container 12 need not be a bottle, as it may be a food bottle, medicine, or any other container that can be refrigerated or cooled. Accordingly, the container 12 is not limited to any particular material or configuration. Surrounding the container 12 is a enclosure 14, which in this embodiment is shown as a sleeve. Also shown is a control unit 16, which further comprises a timer (T) 18, a heating unit (H) 20, and a cooling unit (C) 22. Shown in phantom and inside the sleeve are the thermoregulation pipes 24. A valve 23 may be provided in the unit to regulate the flow of heating and coolant. The piping 24 may be a single pipe but need not be. The control unit 16 is connected to a power source 26. The power source 26 may be a standard cord with plug, an automobile adapter (e.g., car lighter adapter), or any other type of power source.

Accordingly, in operation, the cooling unit 22 sends coolant through the piping 24 to keep the bottle cooled. Once the timer goes off, the cooling unit may shut down and the heating unit may be actuated such that heatant is sent through the piping to heat the bottle. This embodiment is similar to a blood pressure cuff in which air is pumped into the sleeve. In this embodiment, the coolant is pumped via an input pipe 25 and exits the sleeve via an output pipe 27. While the piping 24 is described as pipes, it may also comprise coils, wires, or the like.

Figure 2:
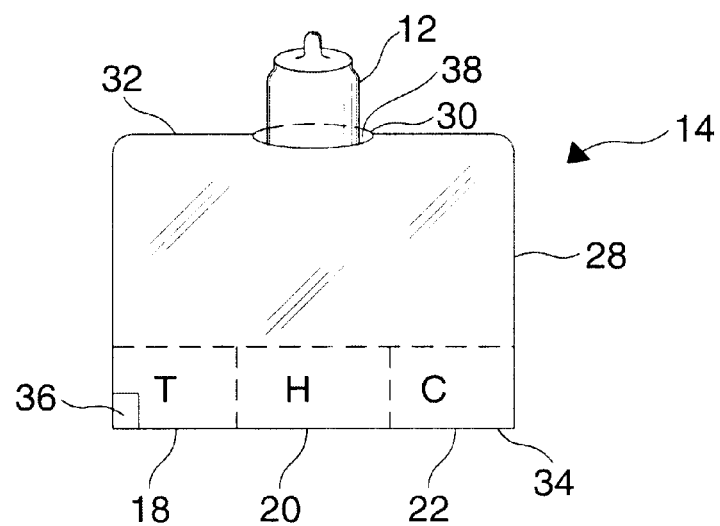
FIG. 2 is another embodiment of the invention.

FIG. 2 demonstrates another embodiment of the invention in which the bottle sits inside a box-like enclosure. Shown is the enclosure 14, which can comprise an outer housing 28 that has a housing orifice 30 at the housing top surface 32. The housing 28 also has a housing bottom surface 34. The housing 28 may also include a drain port 36, which may drain the contents of the housing interior 38. Again shown are the Timer 18, the heating unit 20, and the cooling unit 22. While shown near the bottom of the housing 28, the components may be found anywhere in or around the housing 28 or enclosure 14. The exemplary embodiment shows a more unitary approach to the invention in which all parts are contained in the housing. To reiterate, that while the components are found "in" the housing, it is understood that not all components need be totally inside the housing. Thus, while the bottle 12 is shown in the housing orifice 30 and in the housing interior 38, the bottle need not be totally inside the housing.

In operation, the once the timer goes off, the cooling unit shuts down and the heating unit starts the heating process. In this example, the housing interior 38 may contain fluid, such as water or gel that heats and cools the bottle 12. Thus, in this example, the cooling unit engages to keep the water cool, such that the cooled water cools the bottle. Subsequently, the heating unit heats this water to warm the bottle.

Figure 3:
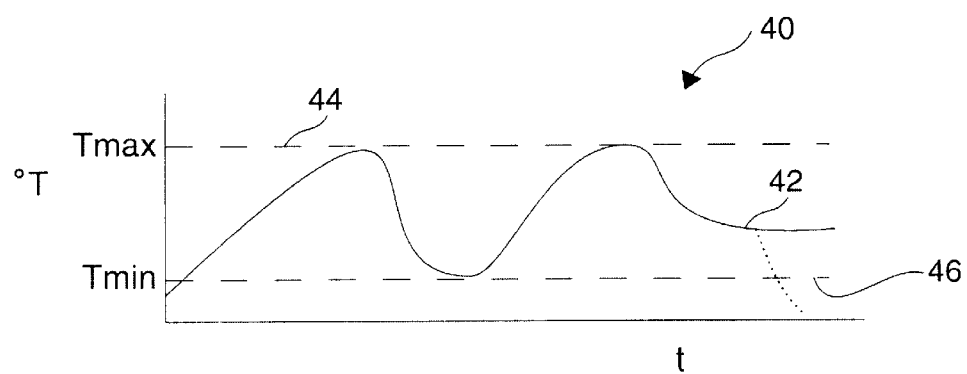
FIGS. 3 and 4 show some thermoregulation graphs.
Figure 4:
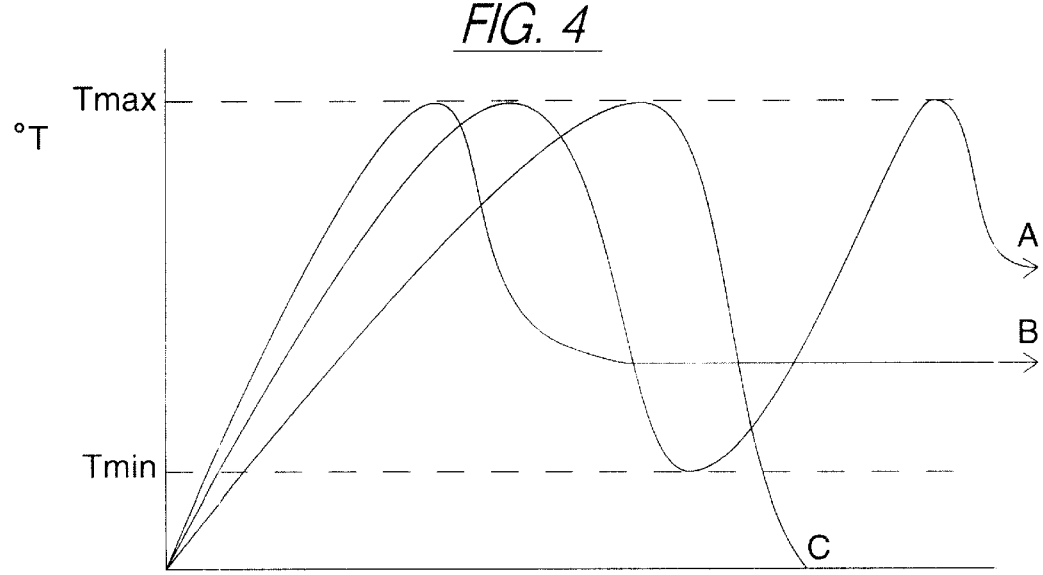

FIGS. 3 and 4 demonstrate various heating and cooling patterns that can be programmed. In FIG. 3, a sample heat graph 40 is shown. The x-axis is time (t) and the y-axis is temperature. In any embodiment, the time can be programmed as seconds, minutes, hours, days, or as actual times; and similarly the temperature may be programmed in any temperature measurement, such as degrees Fahrenheit, degrees Celsius, or the like.

A temperature line 42 is shown cycling between a maximum temperature (Tmax) 44 and a minimum temperature (Tmin) 46. In this particular example, the bottle has a starting temperature at time zero and heats up to the Tmax, then cools (either by reducing the heat application or engaging the cooling unit) until it reaches the Tmin at which it can heat up again and maintain a constant temperature. Shown in dotted lines that after n cycles, the unit can shut completely off and the temperature drops off. The Tmax and Tmin and constant temperature may be manually programmed, pre-programmed, or otherwise preselected. In one embodiment, temperatures may be factory set to avoid extreme heating, overheating, extreme cooling, or overcooling.

FIG. 4 demonstrates other temperature curves. Curve A shows the unit quickly heating (has a greater slope) to the Tmax, rather quickly dropping to the Tmin, heating for another cycle and maintains a constant temperature less than Tmax. Curve B shows a one-cycle operation that quickly heats and then maintains a constant temperature somewhere between Tmin and Tmax. Curve C shows a single cycle operation in which it heats quickly and then cools below Tmin, which means that either the heating unit shuts off completely and the cooling unit engages to return the bottle to the cooled state, or that the heating unit shuts off completely but the cooling unit does not engage. It is understood that in any embodiment, the number of cycles may vary, the speed of heating and cooling may vary, and the constant temperature may vary. As with any embodiment, there may be an auto shut off mechanism to prevent prolonged use.

Figure 5:
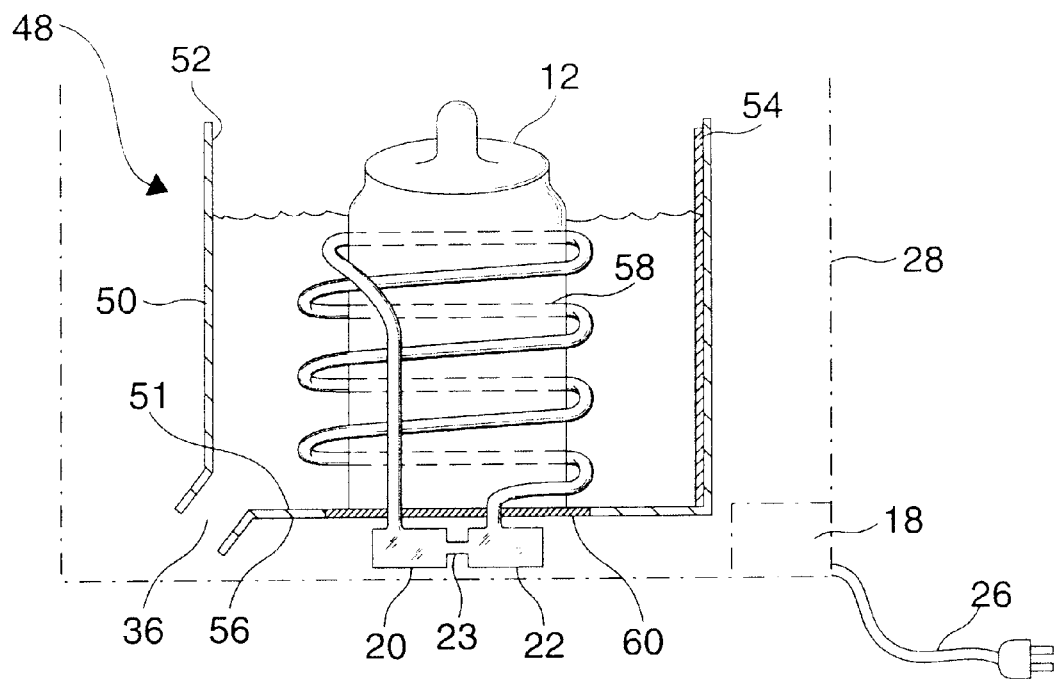
FIG. 5 shows a cross section of one embodiment of the invention.

FIG. 5 shows another embodiment of the invention. Shown is a compartment that is in partial cross section. The outer housing 28 has an inner compartment 48. The inner compartment 48 has an inner compartment wall 50, a compartment floor 51, with the inner compartment wall having an inner compartment wall surface 52. Optionally, there may be a fluid level indicator 54 such as graduations and/or a sensor. The compartment floor has an outer floor surface 56, which is the surface outside the interior of the compartment. The bottle 12 may be surrounded by thermoregulation piping 58, which may be similar to piping 24. The piping 58 may be rigid, partially rigid, or flexible; may be spaced beside the bottle 12 or may be spaced apart. Thus, a bottle may be easily inserted into the coils of the piping 58.

Associated with the compartment floor may be a weight sensor 60. This is optionally present so that the unit can know whether there is fluid in the compartment, indicate the presence of the bottle, indicate how much food is in the bottle, etc. Thus, the weight sensor may act as a safety device such that the absence of a bottle will be noted, or that there is no water bath fluid in the compartment, etc. This prevents dry heating, or prolonged heating. Thus, when the water is filled in the compartment, the sensor can be calibrated such that the addition of the bottle is noted and if the bottle is later absent, then the sensor or sensor alarm will so indicate.

Also shown in FIG. 5 is the drain port 36. The port may include a valve, stopper, or the like to permit the compartment contents to be emptied. Also shown is the heating and cooling unit 20, 22 connected to the piping 58. The valve 23 is shown between the units and thus may regulate the flow of heating and coolant through the piping 58. Thus, in this operation, the cooling unit sends coolant through the piping 58 that cools the surrounding water in the compartment. Once the timer 18 is set off, the heating unit may begin heating the surrounding water in the compartment. Again, the cooling unit may be decreased or shut off completely when the heating unit engages. Thus, as shown, it is desirable (but need not be so) that the piping be near the bottle 12 so that the emitted heat and cold radiates from the pipes to the bottle quickly. Of course, the overall size of the unit may be configured to provide this.

Figure 6:
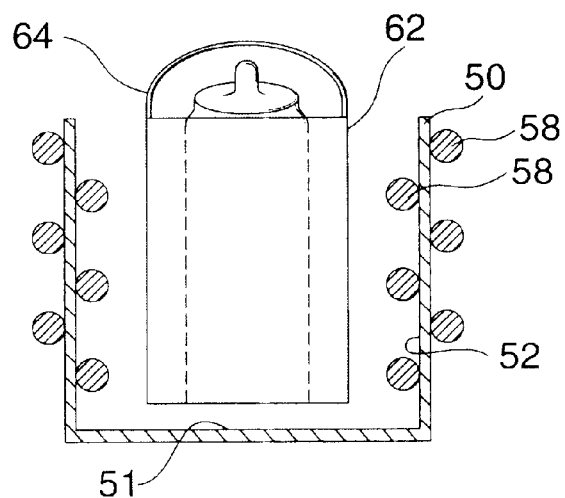
FIG. 6 shows a cross section of another embodiment.

FIG. 6 shows another embodiment of the invention. In this embodiment, the bottle 12 is shown in a basket 62. The basket 62 may be porous or sieve-like and may have a handle 64. In this regard, as a safety feature, since the bottle may be immersed in heated water it may be desirable to lift the bottle out in the basket, thus allowing the surrounding water to drip off the bottle and back into the interior. This avoids having to manipulate a hot bottle. Thus, it may be desirable to have the basket made of non-conductive material so that it or the handle can be easily grasped. It should be understood that the basket is optional.

In this embodiment, the thermoregulation piping 58 is shown outside the inner compartment wall 50. Thus, the heating and cooling may be done via heating or cooling the wall, which subsequently heats or cools the interior. Optionally, the piping 58 may be adjacent to the inner surface 52 of the wall. Thus, the piping may be in direct contact with the water in the interior.

Figure 7A:
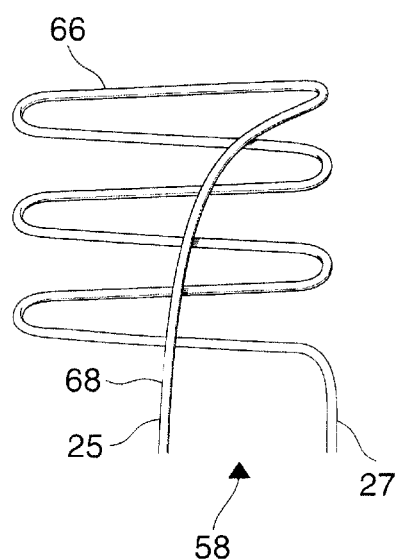
FIGS. 7A–7D show some thermoregulation patterns.

FIGS. 7A, 7B, 7C, and 7D demonstrate various embodiments of the piping 58. One purpose of the piping is to conduct the heating fluid or coolant around the compartment to heat or cool as desired. To maximize the thermoregulation, it is desirable that the piping be in maximum exposure to the interior water bath. Accordingly, as shown in FIG. 7A, the piping may be coiled like a helix such that the piping has a circumferential component 66 and a longitudinal component 68. Thus fluid will move circumferentially and longitudinally. In this embodiment, fluid may enter the pipe at input pipe 25, be pushed up to the top coil and then it flows down and out via the output pipe 27.

Figure 7B:
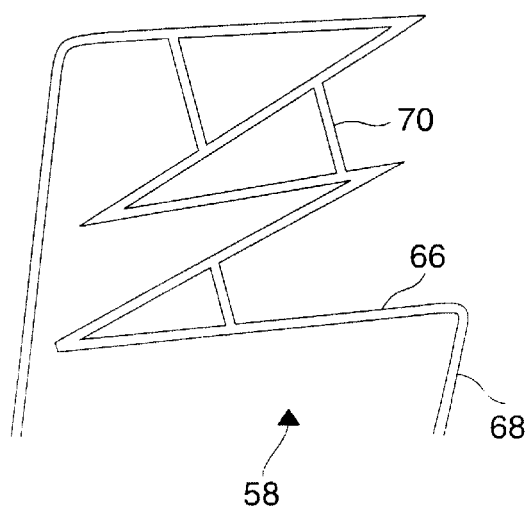

In FIG. 7B, the piping may also be a zigzag pattern. To facilitate the speed of the pipes conducting fluid, the pipes may include bridge pipes 70 to connect adjacent zigs or zags.

Figure 7C:
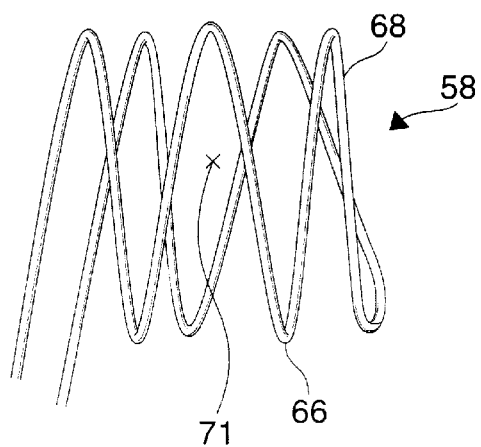

FIG. 7C demonstrates the circumferential view wherein the bottle would normally be inserted into the pipe center.

Figure 7D:
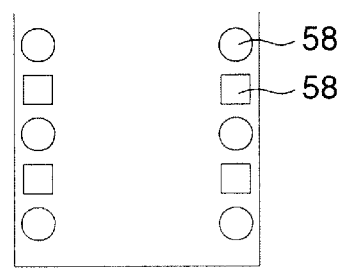

FIG. 7D describes an embodiment where the heating and cooling unit have their own piping such that the hot and cold piping alternate. As shown, coolant piping may be circular and the heating piping as square. The fluid in the piping may be heated or cooled by different units.

Figure 8:
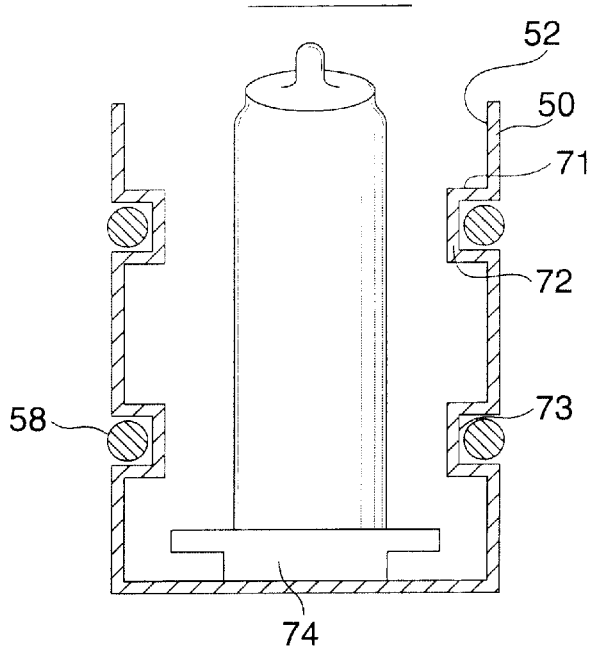
FIGS. 8 and 8A show some additional embodiments.
Figure 8A:
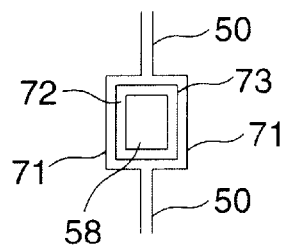

FIG. 8 is another embodiment of the invention. One non exclusive method to maximize heat or cool transfer to the bottle is to ensure that a maximal amount of piping 58 is configured in such as way to draw the most heat out of, or radiate the most heat into, the compartment. Accordingly, the compartment wall 50 may be provided with compartment grooves 72 such that the piping 58 travels partially within the grooves 72. The compartment wall 50 may include a groove outer surface 71 that faces the interior of the compartment and a groove inner surface 73 that faces the exterior of the compartment 50. Thus piping 58 is adjacent to the groove inner surface 73. While the groove 72 is shown as a square, it can of course be any shape and is preferably configured to be similar to the exterior shape of the piping 58. As with any embodiment, for example, shown in FIG. 8A, the groove 72 may be in the compartment wall 50 such that the compartment wall 50 surrounds the piping 58. As shown in this example, the piping 58 is square shaped to be adapted to maximize the piping outer surface area with that of the surrounding inner groove surface 73. Optionally shown in FIG. 8 is a thermoregulation plate 74, which may be in lieu of or in addition to any piping 58. For example, the thermoregulation plate 74 may be a thermoelectric module. In addition, although not shown, the bottle may sit atop a spacer so that it avoids direct contact with the heater.

Figure 9:
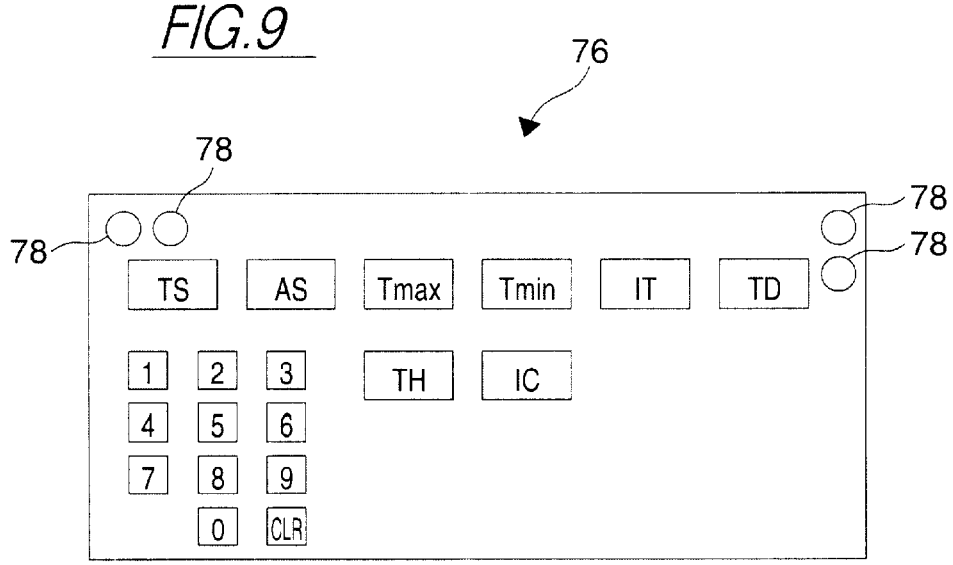
FIG. 9 shows an exemplary input device.

FIG. 9 illustrates an exemplary input device 76. The input device 76, while shown as a keypad, may also include a keyboard, voice activated module, a pointer, a touch screen, or any other type of inputting requirements to the invention. The input device may also include a display indicator 78, which may be any type of display such as, but not limited to, LED, LCD, analog, lights, coloured lights, alarms, flashers, signs, or the like. The input device may include a variety of indicators 78, such as lights to indicate: if the unit is on, receiving power, if in heating mode, if in cooling mode, if maximum temperature is reached, if minimum temperature is reached, or if the unit is in overload or other dangerous conditions. Thus, the indicator 78 may instantly tell the viewer what stage of operation the unit is in or how the unit is operating.

FIG. 9, by way of example, includes a keypad with various input buttons. A numeric keypad may be provided to input numeric data such as time or temperature. The unit may also include separate buttons to set the time, the alarm, the maximum temperature, the minimum temperature, the instant temperature, the time duration, instant heat, or instant cool. Of course additional buttons or input may be added. Furthermore, the unit may be voice controlled. Some of the features could include a time set (TS) button to set the current time; an alarm set (AS) to set when the alarm is to go off, a temperature maximum (Tmax) and temperature minimum (Tmin) to set the maximum and minimum temperatures respectively; an instant temperature (IT) to determine what the temperature currently; a time duration (TD) to determine how long the unit has been operating at the current temperature; an instant heat (IH) to flash heat; or an instant cool (IC) to rapidly cool the unit. Further by way of example, the unit may include red coloured lights to indicate if the unit is heating and/or if the maximum temperature has been reached; and/or blue lights to indicate if the unit is in cooling mode and/or has reached the minimum temperature. Other lights may be provided to determine if the optimal temperature has been reached.

In addition, the unit may include an audible alarm to wake the parent (e.g., LED in combination with piezo buzzer from Radio Shack part number 273-068). There may be a large visual display. The input device may also provide for multiple timers and timer bypass features to instant heat or instant cool the bottle. Timers are also adaptable from coffee machines.

Figure 10:
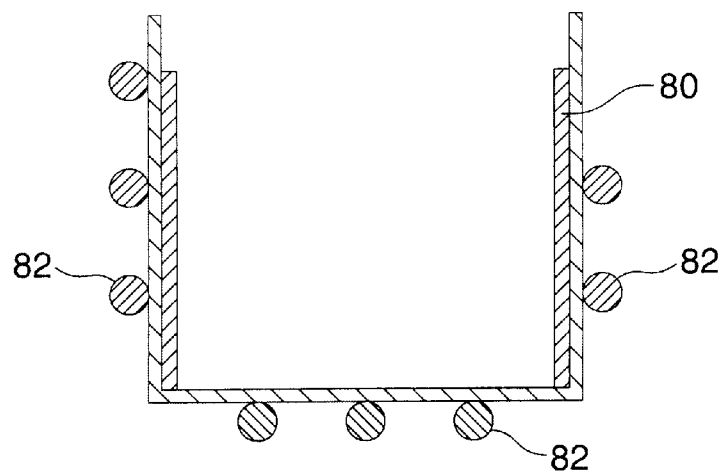
FIG. 10 shows another embodiment.

FIG. 10 shows another embodiment of the invention in which the compartment is fitted with separate heating and cooling units. In this embodiment, inside the compartment wall 50 is a heater coil 80, such as a resistance wire. The heater coil 80 is in direct contact with the water bath inside and thus heats up. Cooling coils 82 may be distributed around the compartment in various configurations. In this regard, the thermoregulator will modulate between energizing the heating coils 80 and the cooling coils 82. Accordingly, during heating the heater coil 80 will energize and heat the fluid while the cooling coils 82 are deenergized. In the cooling mode, the reverse is true.

In any embodiment, there may be temperature sensors to regulate the temperatures and to monitor safety temperatures, turn off the unit after prolonged periods of time. The temperature sensors may also cause the units to toggle between heating and cooling to either heat, cool, or maintain uniform temperatures, The sensor may be coated to keep deposits from forming on it and/or to reduce corrosion. The sensor may be a thermocouple, thermostat, or bimetallic strip.

In any embodiment, the heating methods may be heater coils, radiant heat, convection heating, or conduction. In another embodiment, the heat may be from exothermic reactions of two separate chemicals in separate compartments are then brought together causing an exothermic reaction. Once the timer goes off, valves in each compartment are opened causing the chemicals to come together. Compartments can be recharged with chemicals as needed.

In any embodiment the cooling or refrigeration methods can be recirculating water, an evaporator, cooling done with heat transfer fluid, fins and fans, thermoelectric cooling, Stirling Cycle, absorption, propane, thermoacoustic, or a heat sink. Miniaturized refrigeration may be adapted from existing small refrigeration units. For example, finned tubing is available from Heatron or Energy Transfer Inc. The fan can be a brushless DC motor fan, such as adapted from Micronel part F-80 or an AC motor such as V-72 from Micronel. Fans may also have an outside vent to draw outside air into the fan and perhaps an exit vent too. Capillary tubing to control the mass flow rate of refrigerant into the compressor is available from Wolverine Tube, Inc., of Decatur Ga.

The most common types of refrigerants include air, water, brine, ice, ammonia, carbon dioxide, sulfur dioxide, and such specially prepared substances as chlorofluorocarbons (CFC's), hydrofluorocarbons (HFC's), and methylene chloride.

Exemplary refrigeration mechanism could include a compressor with an evaporator in the reservoir tank and a condenser external to the tank, a pump to recirculate the liquid. The conduit tubes or piping may also have flush valves to flush out liquids and/or prevent growths of organic matter.

In an alternate embodiment, the invention may comprise a compressor operating at 115 volts to compress refrigerant R-22 to condenser via tubing. The compressor can be a Sanyo compressor 1.1 amps with a locked rotor rating of 2.75 amps. As compressor compresses, a conventional finned radiator is used for condensing the refrigerant gas into a liquid form. If the compressor is more than 1.1. amps, then a cooling fan may be used to ventilate the condenser coils. The liquified refrigerant is transported to a dryer and stored in a container for subsequent recycling or recirculation.

In the alternative, coolers adapted from ice cream makers with built in chilling systems may be used. Another alternative cooler can be adapted from a Cole Parmer Polystat refrigerated bath that has built in refrigeration compressor and immersion heating system. It operates from –20 to 200° C. Cole Parmer also has a circulator bath that may be used.

Heatsink technology may be used for cooling. To maximize the cooling the heatsink may have the largest surface area possible and have the best possible amount of airflow across the heat sink. Other adaptations for the heatsink include excellent connection with the compartment so that heat can easily travel from the compartment to the heat dissipation surface. A thermalconductive pad may be used to increase contact. The heatsink may include fins and may be adapted to maximize airflow over the heatsink and through the fins. The heatsink may be made of aluminum or copper, or any other metal that has good thermal conductivity. Heatsink designs may include extruded heatsinks, folded fin heatsinks, bonded fin heatsinks, die-cast, cold forged, milled, or cut heat sink. The heatsink fan may be a ball bearing or sleeve bearing fan. The fan may be chosen to maximize the airflow (CFM—cubic feet per minute).

An embodiment of the invention also includes heating/cooling by a thermoelectric module, which is a semiconductor device to which electrical power is supplied to a positive and negative pole. When power is applied to thermoelectric module, charge carriers within the device absorb heat from one side of a heat transfer plate and release it on the other side of the plate. One can use AC or DC current with the proper adapters if necessary. Examples of devices can be adapted from those made by Telurex, Inc. Another thermoelectric module is from KoolMate® available from UDO Corp., of Salem N.H. Switching the direction of the current will cause the reverse sides to become hot and cold respectively. A thermoelectric device can generate electricity if its two ends are held at different temperatures. Conversely, if the electrical current is applied—as opposed to induced by the temperature differential—this will induce a temperature differential between the two ends. Thus, a thermoelectric device is a heat pump that transfers heat by electric current application. Other thermoelectric heat transfer modules may be adapted from Borg Warner model no. 920-31. The thermoelectric module may be configured to work with a heatsink and fan. The thermoelectric module is useful because it provides for silent operation.

Figure 11:
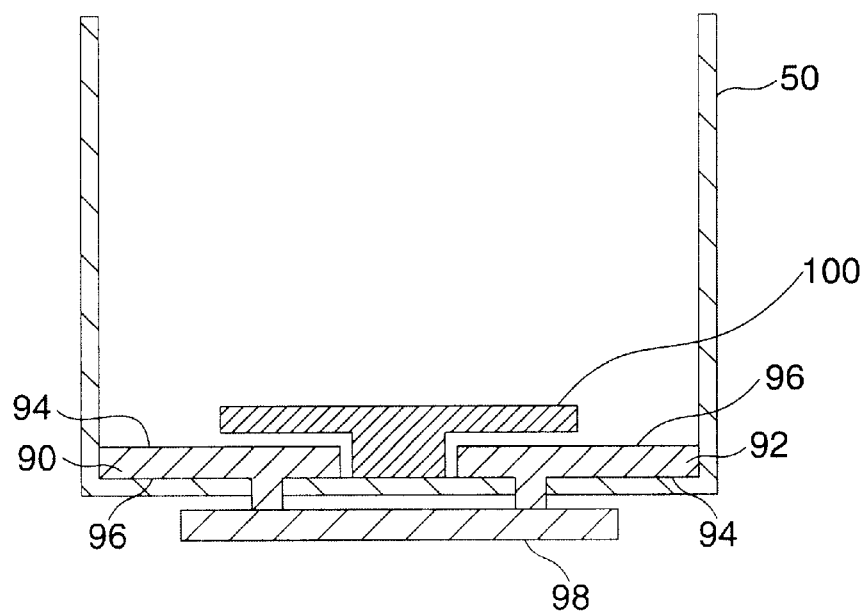
FIG. 11 shows yet another embodiment.

FIG. 11 describes an embodiment in which the thermoelectric module may be used. The compartment may include a first thermoelectric module 90 and a second thermoelectric module 92. Each module has a heat dissipation surface 94 and a heat absorption surface 96. The modules 90, 92 may connect to a current switch 98. The heat dissipation surface 94 and the heat absorption surface 96 of each module 90, 92 are not in the same direction. In operation for example during cooling, the second module 92 will be absorbing heat from into its heat absorption surface 96 from the surrounding water. The first thermoelectric module 90 would normally be off. During heating, the second module 92 would be off and the first module 90 would be on. Since its heat dissipation surface 94 is facing the water, that heat will emanate into the surrounding water. The current switch 98 would control which module is being energized. While the modules are shown on the compartment floor, their location is not fixed as one or more modules may be present and they may be scattered around the compartment.

Furthermore, although not shown, there may be only one module with its cooling surface facing inside and the heating done by the alternate heating modes described herein. For example, the cooling may be done by a thermoelectric module but the heating done by heating coils or resistance wires. Again, current switch 98 may control the energizing of the modules and coils. As with any embodiment, a heatsink may be provided near the cooling module to further enhance cooling.

If there is only one thermoelectric module, that module may be both a heating and cooling unit; or if there are multiple thermoelectric modules, then each or any may be considered heating and cooling units.

Other embodiments of heating and cooling are disclosed in the following patents, the disclosures of which are expressly incorporated by reference: U.S. Pat. No. 6,082,114 to Leonoff; U.S. Pat. No. 6,064,044 to Jerome; U.S. Pat. No. 5,797,313 to Rothley; U.S. Pat. No. 5,771,709 to Smith; U.S. Pat. No. 5,720,171 to Osterhoff; U.S. Pat. No. 5,397,031 to Jensen; U.S. Pat. No. 5,363,746 to Gordon; U.S. Pat. No. 5,315,084 to Jensen; U.S. Pat. No 5,060,479 to Carmi; U.S. Pat. No. 4,914,920 to Carnagie; U.S. Pat. No. 4,913,318 to Forrester; U.S. Pat. No. 4,880,535 to Burrows; U.S. Pat. No. 4,681,458 to Cavalli; U.S. Pat. No. 4,274,262 to Reed; and U.S. Pat. No. 2,756,031 to Sanstrom.

Also shown in FIG. 11 is a shaker or agitator 100. The bottle (not shown) may be rested on the agitator 100. One non-exclusive reason to have an agitator is to shake the bottle during warming to reduce chances of heat bubbles. The agitator can be switched on/off separately or may also be separately programmable. The agitator can be readily adapted from model EW-12601-00 Lindberg/Blue M Refrigerated/Heated Shaking Bath by Cole Parmer, Inc. In this model, it also operates as a shaker, a refrigerated shaker, or a refrigerated utility bath. It provides for adjustable, reciprocating shaking. This bath is ideal for applications that require a reciprocating shaking motion with a temperature uniformity of ±0.1° C. A digital display simultaneously indicates both set and actual temperature. Built-in circulating pump ensures uniform bath temperature.

Other features of the unit may include a tie down or lid on bottle to keep bottle from floating up (keeps bottle immersed); the unit including the lid can be insulated too; or the lid—or any other part of the unit—can be neon and/or glow in the dark. The unit may also include compartments adapted to receive various bottles (e.g., Avent bottles tend to be wider; or bottles may be angled). There may also be multiple compartments (for many bottles) with multiple circuitry. In this regard, one alarm can turn on at a first time and the subsequent alarms at subsequent times.

Other features include adapters for a car lighter use or battery compartment for portability. Any compartment may be adapted for use with baby food bottles. Suction pads may be added to the bottom to increase safety. The thermoregulation pumps may also include a flow meter to regulate how fast the refrigerant cools down the water or how fast the heater heats the water to avoid flash heating/cooling and potential glass breakage or plastic cracks. Furthermore, the temperature sensor can be connected to the flow meter to avoid too rapid heating/cooling. The unit may also include a carrying handle.

In addition, a nightlight to illuminate surrounding area may be provided. For example, a low wattage bulb can be used to illuminate the area and avoid turning on room lights. The nightlight can be along one wall of the unit or may ring around the unit. The light can be always on if it is plugged in, or may have a manual on/off, or turn on once the alarm sounds or timer engages, or turns on once bottle is lifted off bottom plate (i.e., a weight sensor trips the nightlight on).

For increased safety, the unit may be provided with a breakaway cord so that an entanglement.will not pull the unit down, but will break the power cord. Various iterations of breakaway cords are in U.S. Pat. Nos. 5,941,719; 5,480,313; 5,462,452; 5,399,102; 4,874,316; 4,045,105; 3,808,577; 3,611,271; 3,363,214; 2,696,594; 2,490,580; 2,456,548; 2,394,618; and 2,170,287; the disclosures of which are expressly incorporated by reference. In general, these breakaway cords have interruptions in the cord in a male-female plug configuration such that the break will occur at the male-female junction. Other configurations include magnetic plate junctions.

Furthermore, the unit may also include a memory bank so that temperature information may be programmed. In this regard, the maximum temperatures may be set such that the maximum temperature is below the melting point of the bottle or below the melting point of disposable liners. Once programmed, the unit need not be reconfigured each time. In this regard, the unit would not normally burn the plastic bottle or liner.

In another embodiment of the invention, the unit may also comprise a sound receiver adapted to turn on when the baby cries. It is well-accepted that the baby's cry is often loud and of a certain high pitch. To this end, the unit may include a sound transceiver and receiver. The transceiver may be removable such that it may be placed in proximity to the baby. Once the baby begins cry, the transceiver receives the baby cry and transmits it to the unit receiver, which then activates the heater unit. Thus, the unit may be in one room and the transceiver in the baby's room. The unit may also be programmed by including a recording memory unit to record a baby's cry. Once the transceiver receives the crying noise and sends it to the unit receiver, the unit then compares the incoming signal with the preprogrammed cry to determine if the unit should engage the heating unit. The transceiver - receiver units may be readily adapted from the conventional baby room monitors.

It should be understood that the foregoing relates only to a limited number of embodiments that have been provided for illustration purposes only. It is intended that the scope of invention is defined by the appended claims and that modifications to the embodiments above may be made that do not depart from the scope of the claims.

What is claimed is:

1. An apparatus to minimize efforts in container warming using a liquid, comprising:
   (a) a control unit;
   (b) an enclosure, the enclosure including an inner liquid tight chamber, the liquid being in contact with the chamber;

(c) a heating unit associated with the enclosure;
(d) a cooling unit associated with the enclosure; and
(e) wherein the control unit is adapted to manipulate the heating and the cooling unit.

2. The apparatus of claim 1, wherein the control unit further comprises an input device.

3. The apparatus of claim 2, wherein the input device further comprises at least one of a keyboard, voice-activated module, pointer, and touch screen.

4. The apparatus of claim 2, wherein the input device further comprises a display indicator.

5. The apparatus of claim 1, wherein the enclosure is adapted to receive a container.

6. The apparatus of claim 5, wherein the container is a bottle.

7. The apparatus of claim 1, wherein the enclosure includes a drain port.

8. The apparatus of claim 1, wherein the enclosure further comprises an input device, the input device comprising at least one of a keyboard, voice-activated module, pointer, and touch screen.

9. The apparatus of claim 8, wherein the enclosure further comprises a display indicator.

10. The apparatus of claim 1, wherein the enclosure further comprises at least one thermoregulation pipe.

11. The apparatus of claim 10, wherein the enclosure further comprises an input device, the input device comprising at least one of a keyboard, voice activated module, pointer, and touch screen, and a display indicator.

12. The apparatus of claim 1, wherein the enclosure further comprises a fluid level indicator.

13. The apparatus of claim 1, wherein the enclosure further comprises a weight sensor.

14. The apparatus of claim 13, wherein the enclosure further comprises an input device, the input device comprising at least one of a keyboard, voice activated module, pointer, and touch screen; and a display indicator.

15. The apparatus of claim 1, wherein the enclosure further comprises a basket.

16. The apparatus of claim 15, wherein the enclosure further comprises an input device, the input device comprising at least one of a keyboard, voice activated module, pointer, and touch screen; and a display indicator.

17. The apparatus of claim 1, wherein the enclosure is adapted to receive thermoregulation piping.

18. The apparatus of claim 17, wherein the enclosure further comprises an input device, the input device comprising at least one of a keyboard, voice activated module, pointer, and touch screen; and a display indicator.

19. The apparatus of claim 1, wherein the heating unit further comprises at least one of a heater coil, radiant heat module, convection heat module, thermoelectric module, and conduction heat module.

20. The apparatus of claim 19, wherein the heating unit the heating coil is in an interior compartment of the enclosure.

21. The apparatus of claim 19, wherein the apparatus further comprises a temperature sensor adapted to turn on or off the heating unit or cooling unit.

22. The apparatus of claim 21, wherein the temperature sensor is a thermostat.

23. The apparatus of claim 19, wherein the enclosure further comprises an input device, the input device comprising at least one of a keyboard, voice activated module, pointer, and touch screen; and a display indicator.

24. The apparatus of claim 1, wherein the cooling unit further comprises at least one of a recirculating water bath, an evaporator, a heat transfer fluid unit, a plurality of fins, at least one fan, a thermoelectric module, a Stirling Cycle unit, an absorption unit, refrigerant unit, a thermoacoustic unit, and a heat sink.

25. The apparatus of claim 23, wherein the cooling unit further comprises at least one of a recirculating water bath, an evaporator, a heat transfer fluid unit, a plurality of fins, at least one fan, a thermoelectric module, a Stirling Cycle unit, an absorption unit, refrigerant unit, a thermoacoustic unit, and a heat sink.

26. The apparatus of claim 25, wherein the control unit further comprises a temperature sensor.

27. The apparatus of claim 1, wherein the cooling unit further comprises a compressor and an evaporator.

28. The apparatus of claim 19, wherein the cooling unit further comprises a thermoelectric module.

29. The apparatus of claim 28, wherein the enclosure further comprises an input device, the input device comprising at least one of a keyboard, voice-activated module, pointer, and touch screen;
a display indicator; and
a temperature sensor.

30. The apparatus of claim 1, wherein the apparatus further comprises:
the enclosure comprising an input device, the input device comprising at least one of a keyboard, voice activated module, pointer, and touch screen; and a display indicator;
the heating unit comprising a first thermoelectric module;
the cooling unit comprising a second thermoelectric module and a heat sink; and
the control unit is a switch to selectively actuate the first or second thermoelectric modules.

31. The apparatus of claim 30, wherein the apparatus further comprises an agitator.

32. The apparatus of claim 1, wherein the apparatus further comprises an agitator.

33. An apparatus to thermoregulate a container using a liquid, comprising:
(a) a means for adjusting a temperature of an enclosure, the enclosure including an inner liquid tight chamber, the liquid being in contact with the chamber; and
(b) a means for moderating the timing of the adjusting means.

34. The apparatus of claim 33, wherein the means for adjusting the temperature comprises a control unit.

35. The apparatus of claim 34, wherein the control unit comprises a heating unit and a cooling unit.

36. The apparatus of claim 35, wherein the heating unit comprises at least one of a heater coil, radiant heat module, convection heat module, thermoelectric module, and conduction heat module.

37. The apparatus of claim 35, wherein the heating unit comprises a thermoelectric module.

38. The apparatus of claim 35, wherein the heating unit comprises a heater coil.

39. The apparatus of claim 35, wherein the cooling unit comprises at least one of a recirculating water bath, an evaporator, a heat transfer fluid unit, a plurality of fins, at least one fan, a thermoelectric module, a Stirling Cycle unit, an absorption unit, refrigerant unit, a thermoacoustic unit, and a heat sink.

40. The apparatus of claim 35, wherein the control unit comprises an input device, the input device comprising at least one of a keyboard, voice-activated module, pointer, and touch screen;
a display indicator; and a temperature sensor.

41. The apparatus of claim 33, wherein the means for moderating the timing includes a programmable alarm timer.

42. The apparatus of claim 41, wherein the means for adjusting the temperature comprises:
- a heating unit comprising at least one of a heater coil, radiant heat module, convection heat module, thermoelectric module, and conduction heat module;
- a cooling unit comprising at least one of a recirculating water bath, an evaporator, a heat transfer fluid unit, a plurality of fins, at least one fan, a thermoelectric module, a Stirling Cycle unit, an absorption unit, refrigerant unit, a thermoacoustic unit, and a heat sink.

43. A method of providing thermoregulation to a container using a liquid, comprising:
- (a) providing an engaging signal to a thermoregulator; and
- (b) engaging the thermoregulator to heat or cool an enclosure in response to the engaging signal, the enclosure including an inner liquid tight chamber, the liquid being in contact with the chamber.

44. The method of claim 43, wherein the step of providing an engaging signal further comprises actuating a control unit to provide the signal.

45. The method of claim 44, wherein the step of actuating the control unit further comprises manipulating a timer unit.

46. The method of claim 45, wherein the step of manipulating the timer unit further comprises programming the timer unit to go off and engage the thermoregulator.

47. The method of claim 46, wherein the step of engaging the thermoregulator further comprises selecting a heating cycle or a cooling cycle.

48. The method of claim 43, wherein the method further comprises:
- (a) programming a timer to go off at a preselected time to create the engaging signal;
- (b) transmitting the engaging signal to a control unit, the control unit being adapted to manipulate a heating and cooling unit;
- (c) thermoregulating the enclosure for a preselected period of time in response to being engaged by the control unit.

49. A method of warming a container using a liquid, comprising:
- (a) setting an alarm on a unit adapted to receive the container, the unit including an inner liquid tight chamber, the liquid being in contact with the chamber; and
- (b) engaging a heating unit to provide heat to the container when the alarm goes off.

50. The method of claim 49, wherein the method further comprises engaging a cooling unit to engage when the heating unit turns off.

51. A method of warming a container using a liquid in an enclosure, comprising:
- (a) engaging a cooling unit that is adapted to receive the container;
- (b) receiving an alarm activation signal; and
- (c) activating a heating unit in response to the receipt of the alarm activation signal, the enclosure including an inner liquid tight chamber, the liquid being in contact with the chamber.

52. The method of claim 51, wherein the method further comprises engaging the cooling unit once the heating unit has cycled n times.

53. The method of claim 51, wherein the method further comprises shaking the container.

54. An apparatus to minimize efforts in container warming, comprising:
- (a) a control unit;
- (b) an enclosure;
- (c) a heating unit associated with the enclosure;
- (d) a cooling unit associated with the enclosure;
- (e) wherein the control unit is adapted to manipulate the heating and the cooling unit; and
- (f) wherein the enclosure further comprises a basket.

55. The apparatus of claim 54, wherein the enclosure further comprises an input device, the input device comprising at least one of a keyboard, voice activated module, pointer, and touch screen; and a display indicator.

56. An apparatus to minimize efforts in container warming, comprising:
- (a) a control unit;
- (b) an enclosure;
- (c) a heating unit associated with the enclosure;
- (d) a cooling unit associated with the enclosure;
- (e) wherein the control unit is adapted to manipulate the heating and the cooling unit; and
- (f) wherein the cooling unit further comprises at least one of a recirculating water bath, an evaporator, a heat transfer fluid unit, a plurality of fins, at least one fan, a thermoelectric module, a Stirling Cycle unit, an absorption unit, refrigerant unit, a thermoacoustic unit, and a heat sink.

57. An apparatus to minimize efforts in container warming, comprising:
- (a) a control unit;
- (b) an enclosure;
- (c) a heating unit associated with the enclosure;
- (d) a cooling unit associated with the enclosure;
- (e) wherein the control unit is adapted to manipulate the heating and the cooling unit;
- (f) wherein the heating unit further comprises at least one of a heater coil, radiant heat module, convection heat module, thermoelectric module, and conduction heat module;
- (g) wherein the enclosure further comprises an input device, the input device comprising at least one of a keyboard, voice activated module, pointer, and touch screen; and a display indicator; and
- (h) wherein the cooling unit further comprises at least one of a recirculating water bath, an evaporator, a heat transfer fluid unit, a plurality of fins, at least one fan, a thermoelectric module, a Stirling Cycle unit, an absorption unit, refrigerant unit, a thermoacoustic unit, and a heat sink.

58. The apparatus of claim 57, wherein the control unit further comprises a temperature sensor.

59. An apparatus to minimize efforts in container warming, comprising:
- (a) a control unit;
- (b) an enclosure;
- (c) a heating unit associated with the enclosure;
- (d) a cooling unit associated with the enclosure; and
- (e) wherein the control unit is adapted to manipulate the heating and the cooling unit; and
- (f) wherein the cooling unit further comprises a compressor and an evaporator.

60. An apparatus to minimize efforts in container warming, comprising:
  (a) a control unit;
  (b) an enclosure comprising an input device, the input device comprising at least one of a keyboard, voice activated module, pointer, and touch screen; and a display indicator;
  (c) a heating unit associated with the enclosure, the heating unit comprising a first thermoelectric module;
  (d) a cooling unit associated with the enclosure, the cooling unit comprising a second thermoelectric module and a heat sink; and
  (e) wherein the control unit is adapted to manipulate the heating and the cooling unit, the control unit is a switch to selectively actuate the first or second thermoelectric modules.

61. The apparatus of claim 60, wherein the apparatus further comprises an agitator.

62. An apparatus to thermoregulate a container, comprising:
  (a) a means for adjusting a temperature of an enclosure; and
  (b) a means for moderating the timing of the adjusting means;
  (c) wherein the means for adjusting the temperature comprises a control unit;
  (d) wherein the control unit comprises a heating unit and a cooling unit; and
  (e) wherein the cooling unit comprises at least one of a recirculating water bath, an evaporator, a heat transfer fluid unit, a plurality of fins, at least one fan, a thermoelectric module, a Stirling Cycle unit, an absorption unit, refrigerant unit, a thermoacoustic unit, and a heat sink.

63. An apparatus to thermoregulate a container, comprising:
  (a) a means for adjusting a temperature of an enclosure;
  (b) a means for moderating the timing of the adjusting means;
  (c) wherein the means for moderating the timing includes a programmable alarm timer; and
  (d) wherein the means for adjusting the temperature comprises:
    (i) a heating unit comprising at least one of a heater coil, radiant heat module, convection heat module, thermoelectric module, and conduction heat module; and
    (ii) a cooling unit comprising at least one of a recirculating water bath, an evaporator, a heat transfer fluid unit, a plurality of fins, at least one fan, a thermoelectric module, a Stirling Cycle unit, an absorption unit, refrigerant unit, a thermoacoustic unit, and a heat sink.

64. A method of warming a container, comprising:
  (a) setting an alarm on a unit adapted to receive the container; and
  (b) engaging a heating unit to provide heat to the container when the alarm goes off; and
  (c) wherein the method further comprises engaging a cooling unit to engage when the heating unit turns off.

65. An apparatus for warming a container, comprising:
  (a) a control unit;
  (b) an enclosure, the enclosure including an inner liquid tight chamber, the liquid being in contact with the chamber
  (c) a thermoregulating unit associated with the enclosure; and
  (d) wherein the control unit is adapted to manipulate the thermoregulating unit, and the thermoregulating unit manipulates the heating and cooling of the same inner chamber.

66. The apparatus of claim 65, wherein the thermoregulating unit comprises a thermoelectric module, the thermoelectric module being capable of heating and cooling the chamber; the control unit manipulating the thermoelectric module to be in a cooling mode in the absence of a heating activation signal, and further manipulating the thermoelectric module to begin a heating mode in response to the heat activation signal.

67. The apparatus of claim 66, wherein at least one of a manual switch or programmable timer generates the heat activation signal.

* * * * *